A. C. OLANDER.
TIRE PROTECTOR.
APPLICATION FILED AUG. 28, 1919.
1,388,748.
Patented Aug. 23, 1921.
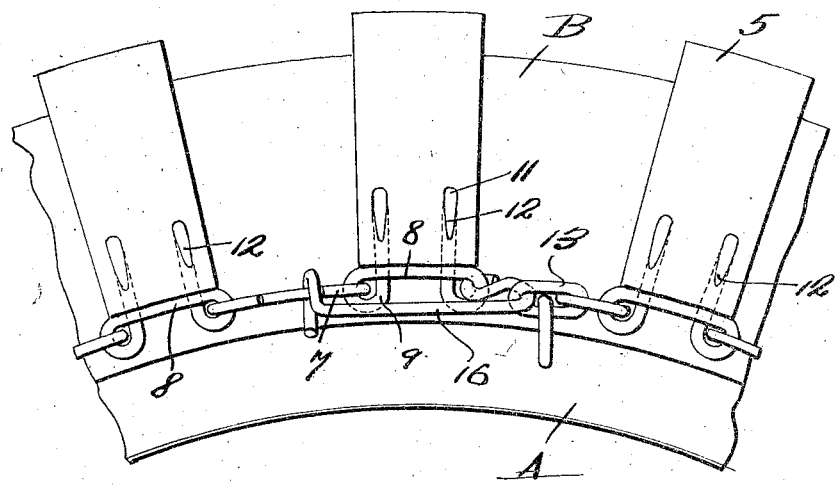
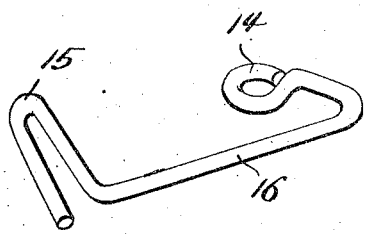
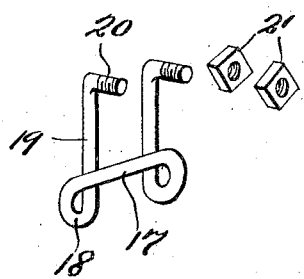
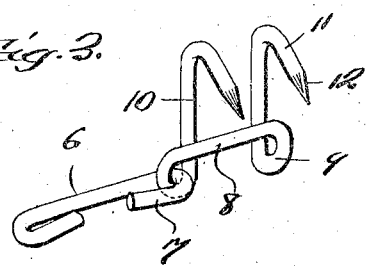
Inventor
A. C. Olander
By Geo. P. Kimmel
Attorney

UNITED STATES PATENT OFFICE.

ALDEN C. OLANDER, OF BILLINGS, MONTANA.

TIRE-PROTECTOR.

1,388,748.  Specification of Letters Patent.  Patented Aug. 23, 1921.

Application filed August 28, 1919. Serial No. 320,497.

*To all whom it may concern:*

Be it known that I, ALDEN C. OLANDER, a citizen of the United States, residing at Billings, in the county of Yellowstone and State of Montana, have invented certain new and useful Improvements in a Tire-Protector, of which the following is a specification.

The invention relates to a tire protector, and more particularly to the class of anti-skidding devices adapted for use in connection with pneumatic, cushion or other forms of vehicle tires.

The primary object of the invention is the provision of a device of this character, wherein a plurality of tread members can be fastened about a tire and at all times held in close engagement therewith, so as to protect the tire and at the same time avoid any possibility of the slipping of the tire when traveling over wet or icy surfaces.

Another object of the invention is the provision of a device of this character, wherein the tread members are connected to the retaining chains in a novel manner, so that any one of the tread members can be readily detached should the same become damaged or unfit for use and a new tread member substituted therefor, the retaining chains being of novel construction so as to permit the tread members to be held in close engagement with the tire when the device is applied thereto, and so as to avoid any possibility of the slipping of the device or the accidental detachment thereof when in use.

A further object of the invention is the provision of a device of this character wherein old or damaged tires can be utilized to make the tread members, which can be readily and easily attached to the retaining chain, so that the device can be applied to a tire for protecting the same and also to serve as an anti-skidding attachment, the device being devoid of any rivets, thereby enabling the parts of the device to be readily assembled and disassembled as the occasion may require, and also said device can be readily applied to the tire or removed at will.

A still further object of the invention is the provision of a device of this character, which is extremely simple in construction, very reliable and efficient in its purpose, strong, durable and inexpensive to manufacture.

With these and other objects in view, the invention consists in the features of construction, combination and arrangement of parts as will be hereinafter fully described, illustrated in the accompanying drawing and pointed out in the claim hereunto appended.

In the accompanying drawing:

Figure 1 is a fragamentary side elevation showing portions of a vehicle wheel, with the tire thereon and the device constructed in accordance with the invention applied.

Fig. 2 is a perspective view showing in detail one of the securing or latching members of the device.

Fig. 3 is a perspective view showing one of the double side hooks employed in the device, together with its coupling link.

Fig. 4 is a perspective view of a slight modification of double side hooks.

Similar reference characters indicate corresponding parts throughout the several views in the drawing.

Referring to the drawings in detail A designates a portion of a vehicle wheel which may be of any desired construction and provided with a tire B of the pneumatic cushion type and formed of rubber or other suitable material.

The tire protector or anti-skidding device comprises a plurality of tread members 5 which are engaged an equidistance apart circumferentially of the tire B and disposed transversely thereof, these members 5 being preferably cut from a used tire in the form and shape as shown in Fig. 1 of the drawing.

The members 5 are mounted transversely of the tire B and lie crosswise thereof as shown in Fig. 1 of the drawing and there is employed a pair of retaining chains, only a portion of one of the same being shown. Each chain comprises a plurality of connecting links 6 formed with the closed loop ends 7 for the loose connection of adjacent double side hooks therewith. Each double side hook is made from a single length of wire bent into substantially U-shape forming the cross connection portion 8, eyes 9 and spaced parallel limbs or shanks 10, the loops 7 of the link 6 being loosely engaged in the eyes 9, while the limbs or shanks 10 at their end portions are bent outwardly and downwardly at a slight inclination to provide the attaching hooks 11 having the pointed tips 12, which are passed through the members 5 near the ends thereof for the connection of said members with the chains as is clearly shown in Fig. 1 of the drawing.

After the hooks 11 are passed through the members 5 for attaching the said members to the chain the hooks are then clenched or tightly closed inwardly after being passed through the bodies of said members, so that the latter are firmly and securely fastened to the double side hooks. When it is desired to replace a member 5 the hook ends 11 are opened or sprung outwardly and said member is detached from the side hooks and a new member substituted.

A sufficient number of links 6 and the double side hooks are connected together to extend substantially around the periphery of the tire with which the same is to be used. Each retaining chain at its meeting end is adjustably and detachably connected in order to secure the same upon the tire and to accomplish this one of the links 6 is dispensed with between adjacent double side hooks and in lieu thereof to one of the eyes 9 of one double side hook is connected a link chain 13, while connected to the eyes 9 of the adjacent double side hook is a swinging latch or locking member. The latch or locking member is made from a single length of wire to provide an eye end 14, a hooked end 15 and an intermediate substantially U-shaped bail portion 16. The eye end 14 is loosely engaged with the eye 9 of the double side hook to which the latch or locking member is connected while the bail portion 16 is adapted to be loosely passed through one of the links of the short length chain 13 and the hook end 15 engaged with one of the connecting links 6 adjacent thereto as is clearly shown in Fig. 1 of the drawing. In this manner the retaining chain is properly adjusted about the periphery of the vehicle wheel A and fastened to its ends for securing the members 5 crosswise or transversely of the tire B upon said wheel. The hook end 15 of the latching or locking member is slightly elongated and is held engaged with the link 6 to which the same is connected by friction so that there is no possibility of the accidental detachment of the latching or locking member after being fastened for connecting the ends of the side chain as is shown in Fig. 1 of the drawing.

In Fig. 4 of the drawing there is shown a slight modification of double side hooks, wherein the same includes the cross intermediate connecting portion 17, eyes 18 and spaced parallel shanks 19, these being identical with the portions 8, 9 and 10 of the double side hooks hereinbefore described, excepting that the shanks or limbs 19 are bent at the end portions thereof at right angles outwardly and provided with threads 20 for receiving nuts 21 which secure the ends of the shanks 19 in the members 5 and thereby fasten the latter to the double side hooks as shown in Fig. 4 of the drawing. Thus it will be seen that the member 5 is detachably fastened to the double side hook so that said member can be replaced when the occasion requires, the member 5 being preferably cut and made from an old or used tire, thereby utilizing the latter when unfit for further use otherwise.

From the foregoing it will be seen that there is provided a device which at all times can be maintained tightly upon the tread of the wheel with which the same may be used. It will also be seen that the device is of very cheap construction and that any part thereof which may become worn may be readily replaced. The spacing of the transverse members 5, which are cut from an old tire, enables the tire to which the protector is applied to be cooled to a large degree and at the same time avoid undue friction thereon, which would result should the protector be of solid formation. Furthermore the protector by reason of the particular construction thereof by the use of the members 5 cut from an old tire and arranged as hereinbefore described mimimizes weight, yet assures longevity to the said protector and the required strength and durability.

From the foregoing it is thought that the construction and manner of use of the device will be clearly understood and therefore a more extended explanation has been omitted.

What is claimed is:

In a device of the character described comprising spaced, transverse, tread members adapted to embrace a vehicle tire, U-shaped, normally upright hooks having sharpened upper terminals retaining said tread members and preventing longitudinal movement thereof with respect to the tire, the lower portion of said hooks being provided with reversely directed attaching eyes, loosely connected short chains connecting certain of the eyes of the adjacent hooks and closed links attached to the opposite eyes of said hooks.

In testimony whereof, I affix my signature hereto.

ALDEN C. OLANDER.